United States Patent
Kumar et al.

(10) Patent No.: US 8,942,674 B2
(45) Date of Patent: Jan. 27, 2015

(54) RESPONDING TO INCOMING CALLS

(71) Applicant: Research In Motion Limited, Waterloo (CA)

(72) Inventors: Surender Kumar, Palatine, IL (US); Susan L. Lukasik, Lombard, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/745,152

(22) Filed: Jan. 18, 2013

(65) Prior Publication Data

US 2014/0205076 A1    Jul. 24, 2014

(51) Int. Cl.
| H04M 1/00 | (2006.01) |
| H04M 1/64 | (2006.01) |
| H04L 12/58 | (2006.01) |
| H04M 3/42 | (2006.01) |

(52) U.S. Cl.
CPC ................. *H04M 3/42212* (2013.01)
USPC ..... 455/412.1; 455/569.1; 455/466; 455/567; 379/88.11; 379/88.12

(58) Field of Classification Search
USPC ........ 379/93.17, 93.23, 142.01, 142.04, 379/142.07, 142.08, 142.12, 142.17, 379/207.14, 211.02, 212.01, 215.01, 88.11, 379/88.12, 372, 373.01; 455/567, 569.1
See application file for complete search history.

(56) References Cited

U.S. PATENT DOCUMENTS

| 5,457,732 | A  | * | 10/1995 | Goldberg | 340/7.23 |
| 6,353,611 | B1 | * | 3/2002 | Norris et al. | 370/356 |
| 6,377,795 | B1 | * | 4/2002 | Bach et al. | 455/417 |
| 6,564,696 | B2 | * | 5/2003 | Koncelik, Jr. | 99/285 |
| 7,555,110 | B2 |   | 6/2009 | Dolan et al. | |
| 7,949,353 | B2 |   | 5/2011 | Pollock et al. | |
| 8,019,056 | B2 | * | 9/2011 | Worley et al. | 379/88.18 |
| 8,311,189 | B2 | * | 11/2012 | Champlin et al. | 379/88.17 |
| 8,340,643 | B2 | * | 12/2012 | Higuchi et al. | 455/412.2 |
| 8,346,221 | B2 | * | 1/2013 | Higuchi et al. | 455/412.2 |
| 8,467,502 | B2 | * | 6/2013 | Sureka et al. | 379/88.12 |
| 8,737,978 | B1 | * | 5/2014 | Thomas et al. | 455/415 |
| 2004/0176083 | A1 |   | 9/2004 | Shiao et al. | |
| 2004/0202300 | A1 | * | 10/2004 | Cooper et al. | 379/201.01 |
| 2004/0203794 | A1 | * | 10/2004 | Brown et al. | 455/445 |
| 2005/0124324 | A1 | * | 6/2005 | Thomas et al. | 455/412.1 |
| 2007/0142047 | A1 |   | 6/2007 | Heeschen et al. | |
| 2007/0248221 | A1 | * | 10/2007 | Chatterjee et al. | 379/211.02 |
| 2009/0061833 | A1 | * | 3/2009 | Ho et al. | 455/414.2 |
| 2009/0104895 | A1 | * | 4/2009 | Kasturi et al. | 455/414.1 |
| 2010/0105446 | A1 | * | 4/2010 | Charlier et al. | 455/569.1 |
| 2011/0164535 | A1 |   | 7/2011 | Gillipalli et al. | |
| 2013/0344849 | A1 | * | 12/2013 | Chatterjee et al. | 455/413 |

FOREIGN PATENT DOCUMENTS

WO    2007/109342    9/2007

OTHER PUBLICATIONS

EESR dated Jun. 5, 2013 for European Patent Application No. 13151915.9.

\* cited by examiner

*Primary Examiner* — Binh Tieu
(74) *Attorney, Agent, or Firm* — Jeffrey N. Giunta; Fleit Gibbons Gutman Bongini & Bianco P.L.

(57) ABSTRACT

A method and device for responding to an incoming call. A first device detects an incoming call from a caller. In response to detecting the incoming call, an indication of the incoming call is sent to a second device different from the first device. The indication identifies the caller. A message indicating a response to the caller is received from the second device.

19 Claims, 6 Drawing Sheets

RESPONDING TO INCOMING CALLS

FIELD OF TECHNOLOGY

The present disclosure relates generally to telecommunications, and more particularly, to call handling and responses utilizing multiple devices.

BACKGROUND

A person who receives an incoming call such as a telephone call typically has several options. Under some circumstances, the person may not desire to answer the call because he or she is busy, or already engaged in call with another person. In some telephone systems, the person calling a phone that is in use hears an audible "busy signal." In some systems, if the phone being called is not answered, the incoming call is directed to a voice mail system or to an automated attendant that presents options to the caller.

DETAILED DESCRIPTION

Figure 1:
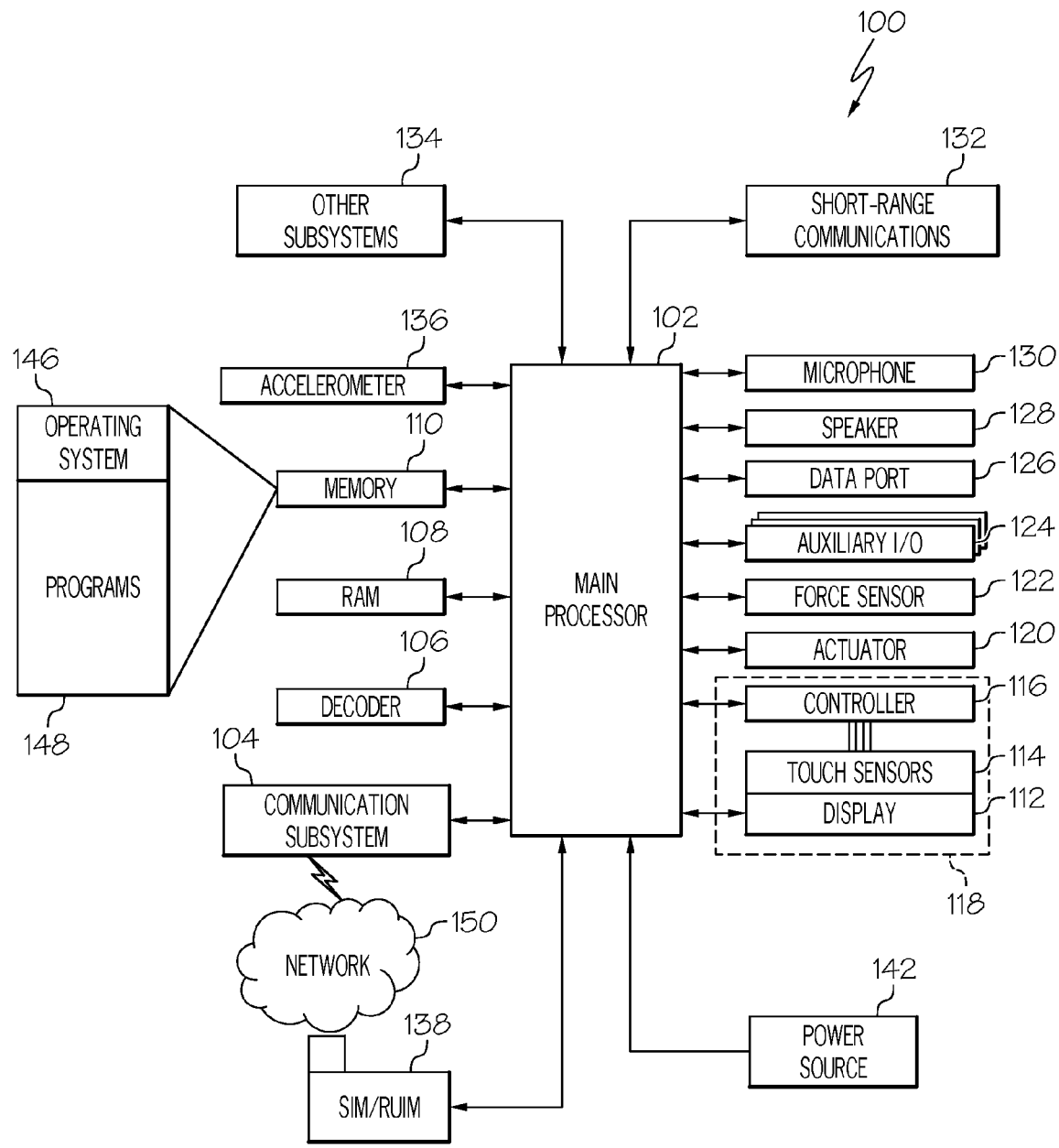
FIG. 1 illustrates an example of block diagram of a portable electronic device.

The following describes examples wherein one or more electronic devices provide alternatives to responding to an incoming call when it is desired to not answer the call. In one example, a user of a first electronic device in receipt of an incoming call can more conveniently specify more customized responses to incoming calls that the user does not want to answer. In one example, the first device to which an incoming call is directed sends an indication of the incoming call to one or more second electronic devices that are associated with the person being called. In this regard, the device to which the incoming call is directed and that sends the indication of an incoming call, is referred to as a first device. This second electronic device is that which receives from the first device an indication of an incoming call and automatically provides options for selecting a response message to send to the caller. The response message sent to the caller in one example is an alternative to answering the incoming call. A response message that is to be sent to the caller is, for example, selected from a list presented on a display of the second device. The selected message is sent to the caller originating the incoming call. Utilizing a second device to select the response message facilitates a more convenient operation for selecting the response message to be sent. Utilizing a second device is particularly effective when the user's first device is held to the user's ear. Various examples implementing the subject matter of the disclosure are discussed in detail below.

An electronic device refers to any type of device that is capable of receiving data, transmitting data, executing commands, and so forth. Data includes, but is not limited to, text data, voice data, video data, other types of data, or combinations thereof.

Electronic devices include portable electronic devices and non-portable electronic devices. Examples of portable electronic devices include mobile or handheld wireless communication devices such as pagers, cellular phones, cellular smart-phones, wireless organizers, personal digital assistants, wirelessly enabled notebook computers, tablet computers, netbooks, mobile internet devices, electronic navigation devices, cordless phones, and so forth. The portable electronic device may be a portable electronic device without wireless communication capabilities, such as handheld electronic games, digital photograph albums, digital cameras, media players, e-book readers, internet protocol (IP) phone, and so forth. Examples of non portable electronic devices include desktop computers, electronic white boards, smart boards utilized for collaboration, built-in monitors or displays in furniture or appliances, wireline phones, and so forth.

In addition to portable electronic devices, electronic devices include, but are not limited to non portable electronic devices that include, for example, desktop computers, electronic white boards, smart boards utilized for collaboration, built-in monitors or displays in furniture or appliances, and so forth.

The following description refers to calls that are established and maintained between or among two or more electronic devices. The calls described below may be any type of call, including but not limited to voice calls, video calls, text communications sessions, any type of communications sessions, or combinations of these. Voice calls include, but are not limited to conventional wireline telephone calls, wireless telephone calls, cellular telephone calls, Voice over IP (VoIP) calls using analog, digital or combinations of analog and digital equipment including combinations of analog and digital, any type of voice call or combinations of these. Video calls generally refer to communications sessions between two devices or among three or more devices that convey audio and video information from at least one device participating in the call to one or more other devices participating in that call. Calls are able to be conveyed over any type of network, including but not limited to circuit switched communications networks, packet switched communications networks, or combinations of these. Calls are able to be initiated or placed by various techniques, such as dialing a phone number on a wired or wireless phone system or establishing any type of communications session with one or more remote devices. In one example, calls are able to be established and maintained by using Session Initiation Protocol (SIP) techniques or any other techniques through any communications system that supports protocols to establish calls, maintain calls, terminate calls, or any combination of these.

A block diagram of an example of a portable electronic device 100 is shown in FIG. 1. The portable electronic device 100 is an example of a type of electronic device, as is discussed below, that is able to perform some or all of the various aspects of the below described operations. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a communications network 150. The communications network 150 may include one or more networks that may be wireless and/or wired networks, including, but not limited to, data networks, voice networks, networks that support voice over data communications channel networks, and networks that support both voice and data communications, any combination of networks, and so forth. The communications network 150 may include public and private networks. The communications network 150 may include local and wide-area networks. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications subsystem 132 and other subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the communications network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the communications network 150, the auxiliary I/O subsystem 124, the data port 126, the short-range communications subsystem 132, or any other subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the communications network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A touch may be detected from any suitable input member, such as a finger, thumb, appendage, or other objects, for example, a stylus, which is able to be active, passive, or combinations of active and passive, pen, or other pointer, based on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Figure 2:
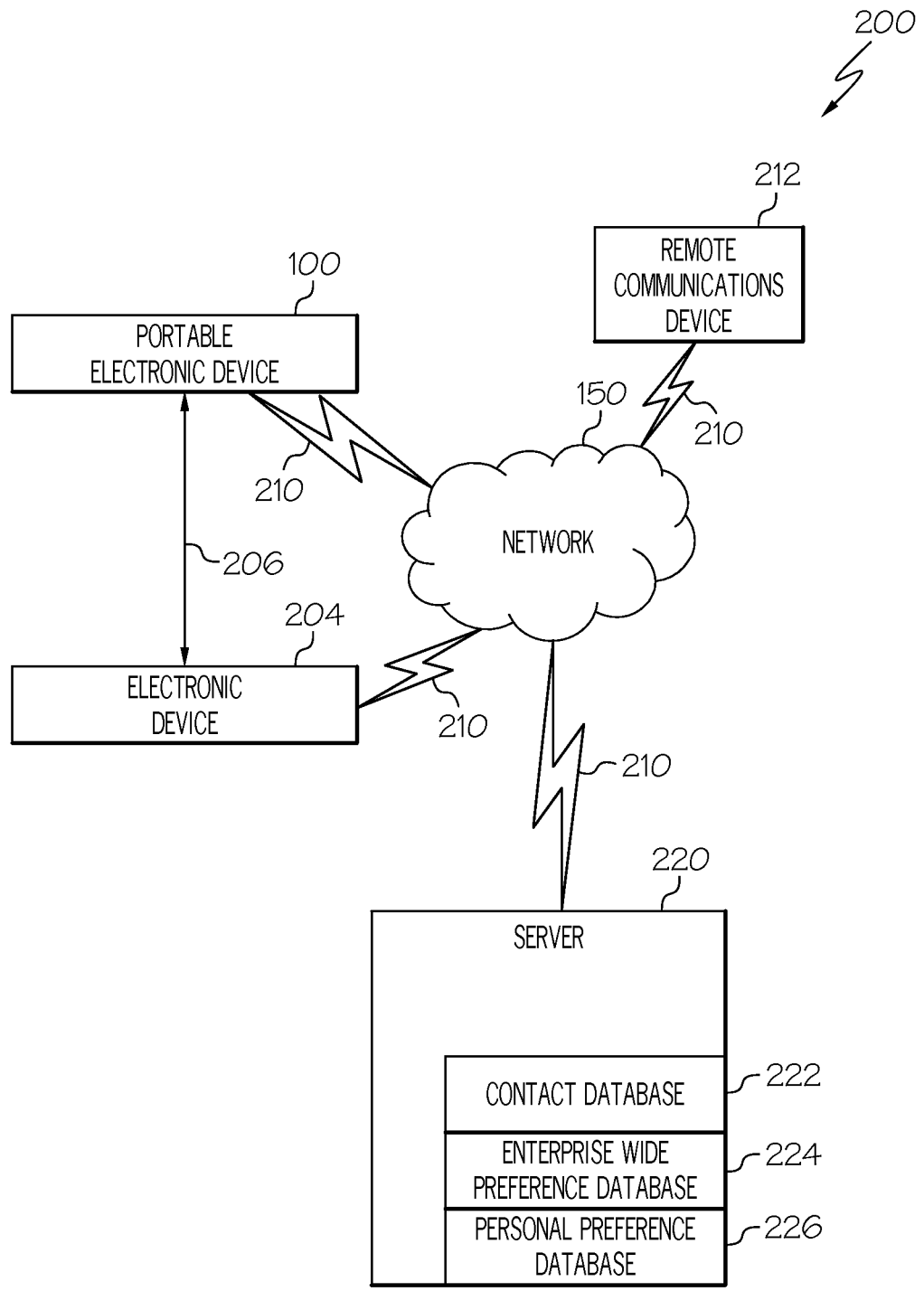
FIG. 2 illustrates an example of a communications system.

FIG. 2 illustrates an example of a communications system 200. The communications system 200 shows only a few representative elements that are present in a broader communications system in order to more clearly and concisely describe relevant portions of the below described systems and methods. It is clear that communications systems that include examples of the below described systems are able to include, but are not required to include, many more elements.

The communications system 200 includes a portable electronic device 100, which is similar to the portable electronic device 100 described above with regards to FIG. 1. In general, an electronic device operating in a manner such as described below may receive, initiate, and maintain any type of call.

The communications system 200 further includes a remote communications device 212. The remote communications device 212 is able to be similar to the portable electronic device 100 or is able to be any type of electronic device that may be different in any degree from the portable electronic device 100. The remote communications device 212 in this example is able to receive, initiate and maintain any type of call.

In operation, two or more electronic devices, such as the portable electronic device 100 and the electronic device 204, are able to establish and maintain calls with each other and optionally with remote communication devices 212 through the communications network 150. These two or more electronic devices are able to include any combination of one or more portable electronic devices, one or more non-portable electronic devices, or combinations of portable electronic devices and non-portable electronic devices. The communications system 200 is able to establish and maintain any type of call between two or more electronic devices.

For example, the remote communications device 212 initiates a call to the portable electronic device 100. For example, the remote communications device 212 and the portable electronic device 100 are each assigned unique addresses or other identifier that facilitate identification of a particular communications device by the communications network 150 in order to initiate or continue communications with that particular communications device over the communications network 150. For example, the remote communications device 212 is able to place a call, such as a voice or video call, to the portable electronic device 100 by connecting to the communications network 150 and dialing a telephone number assigned to the portable electronic device 100 by the communications network 150.

The portable electronic device 100 in the illustrated example may be in proximity to one or more other electronic devices, such as the illustrated electronic device 204.

The communications system 200 depicts a direct communications channel 206 that provides communications between the electronic device 204 and the portable electronic device 100. Examples of the direct communications channel 206 include one or more local wired or wireless communications channels. Examples of a local wired communications channel include a Universal Serial Bus (USB) connection or another wired data channel between the portable electronic device 100 and the electronic device 204. Examples of local wireless communications channels include a Bluetooth®, Zigbee™, wireless LAN, or similar wireless channels that support point-to-point data communications.

In some examples, when a user is using a first device, such as the portable electronic device 100, to conduct an ongoing call, the user is able to use the below described processes to handle response to another incoming call that is detected during the ongoing call. The first device, such as the portable electronic device 100, operates to send an indication of the incoming call to one or more second electronic devices, such as the electronic device 204. In general, the one or more second electronic device, such as the electronic device 204, that receives the notification is associated with a person that is also associated with the first device, such as the portable electronic device 100, that receives the incoming call. This association is able to be indicted by, for example, a user's identification that is used when logging into the electronic device 204 and that identification being further associated with the portable electronic device 100. In one example, the electronic device 204 has an installed application that receives the indication of an incoming call and that automatically provides an option to select a response message that is sent to the caller. The indication received by the electronic device 204 is able to include various amounts of information about the caller, such as only the telephone number of the phone originating the call, or additional information.

In various examples, the second device, such as the electronic device 204, provides a list of responses to send to the caller. In some examples, the response is a message that is selected to be sent by either the first device, such as the portable electronic device 100, to which the incoming call is directed, or the response is a message that is selected to be sent by the second device, such as the electronic device 204, that allows selection of the response to be sent. In some examples, the second device presents a selection of communications networks that are to be used to send the response. Such communications networks or channels include, for example, e-mail, Blackberry Messenger (BBM)/Instant Messaging (IM), Short Messaging Service (SMS), other communications channels, or combinations of these. The selection of a device to send the response over the selected communication channel may be based upon for example the availability or ability of the device to communicate using the selected communications network or channel. In one example, a first device that is a cellular telephone may have access to SMS and BBM/IM communications networks or channels, but does not have access to a communications channel or network to send e-mail messages. In this example, the second device may have access to a wireless Internet communications channel or network to send e-mail and also have access to a communications network or channel to send BBM/IM messages, but does not have access to communications networks or channels to send SMS messages. In such an example, sending a response message over SMS is selected to be performed by the first device based on the first device's access to a communications channel or network for that type of response, and the lack of access to such a channel or network by the second device. Sending a selected response message in an e-mail message is performed by the second device based on the second device's access to an e-mail communication's channel or network and the lack of access to such a channel or network by the first device. When the selected response indicates sending the response by a BBM/IM message, either the first device or the second device has access to a suitable BBM/IM messaging communications channel or network and is able to send the BBM/IM message. The selection of a device to send the BBM/IM message in this example is able to be made based upon, for example, configuration data, capability of the device, a user input, or other techniques.

The communications system 200 further includes a server 220. The server 220 is an example of a general data server that is able to store for example, contact information and user preference data. In one example, the server 220 includes a Blackberry Enterprise Server available from Research In Motion Ltd. of Waterloo, ON, Canada. In the illustrated example, the server 220 includes a contact database 222 that stores personal contact information for people, such as employees, customers, contractors, or other persons associated with the enterprise. Contact information includes, for example, telephone numbers, e-mail addresses, text messaging addresses, mailing addresses, and other information for persons associated with the enterprise. Contact information is maintained in the contact database 222 for individuals and companies that have various connections to the enterprise, such as employees, customers, suppliers, and the like.

In some examples, the server 220 further includes a call controller, such as a Private Branch Exchange (PBX) or other call controller. Call controllers included in the server 220, for example, control calls between or among other electronic devices, or combinations of electronic devices such as the first device and the second device, such as the portable electronic device 100, the electronic device 204, or any other electronic device. In some examples, the call controller may be configured to forward incoming calls to a person's primary telephone, to the person's wireless phone, or computer, such as when the person's primary telephone phone is in use or otherwise unavailable. An example of a communications system is the Blackberry® Mobile Voice System available from Research In Motion Ltd. of Waterloo, ON, Canada. In such an example, the selection or identification of a device that displays an incoming call notification is able to be incorporated into this telephonic communications system such that the device to which the call is transferred is configured to also present the notification.

The server 220 may store preference data that identifies preferred operations of electronic devices, such as preferred options for presenting incoming call notifications. Preference information may be identified for all individuals associated with the enterprise, or individual preference information may be identified. An enterprise wide preference database 224 stores preferences that are applied to all individuals in the enterprise. The enterprise wide preferences stored in the enterprise wide preference database 224 are generally identified by the enterprise and are applied devices used by all of the enterprise's employees. A preference database 226 stores preference information that is identified by individuals using various devices. The preferences stored in the enterprise wide preference database 224 may or may not be able to override or contradict preferences stored in the preference database 226. In general, the enterprise wide preference database 224 identified which preferences may or may not by overridden by user-selected preferences stored in the preference database 226.

Communications between the communications network 150 and the various devices 100, 204, 212 and server 220 take place over wired or wireless communications channels 210 that support the type of communication, such as described above.

Figure 3:
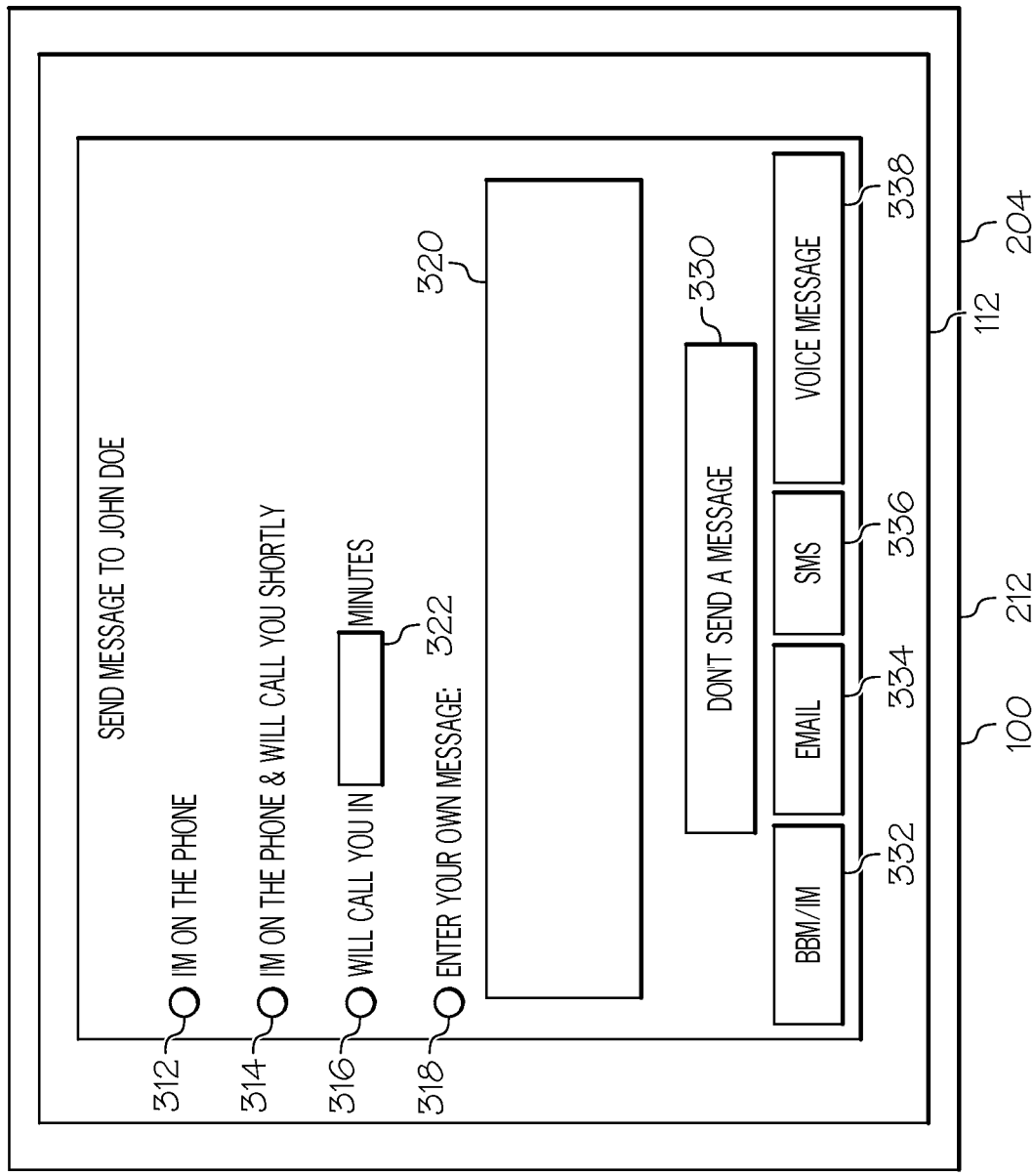
FIG. 3 is an example of a device presenting a notification with response options.

FIG. 3 is an example of a device presenting a notification with response options. The device presenting a notification with response options depicts a user interface presentation on an electronic device 100, 212, 204, that is presented to a user on a user interface display 112 of the device 100, 212, 204. In various examples, the illustrated display of the device presenting a notification with response options is able to be presented on a device display, on a computer display, a tablet computer display, on a display of a wired telephone such as a desktop phone, or on any suitable display. The illustrated display of the device presenting a notification with response options is able to be presented to a user based on, or in response to, receiving an incoming call during a period when the user does not want to accept incoming calls.

As described below, the device presenting a notification with response options presents the user with a notification of an incoming call and further displays a number of response options from which the user is able to select for responding to the incoming call. For example, a user is able to select one or more of the presented response options, and one or more responses associated with the selected option or options is or are able to be sent to the caller to notify the caller that the person being called is unavailable. In the illustrated example, the device presenting a notification with response options presents options for a message containing selected text to be sent to the caller to inform the caller that the person being called is unable to accept the call. The device presenting a notification with response options further presents options for the communications network to use to deliver the text message to the caller, such as the below described Blackberry® Messenger (BBM)/instant messaging service, conventional E-Mail, or Short Messaging Service (SMS). Additionally, the person receiving the call is able to make a selection that causes a voice message to be provided that conveys the selected message.

Referring to the communications system 200 described above, the device presenting a notification with response options illustrates a presentation on the electronic device 204 in response to an indication sent by the portable electronic device 100 has detected an incoming call. In this example, the indication sent by the portable electronic device 100, and that is received by the electronic device 204, is able to include various contact information associated with the caller placing the detected incoming call. For example, the name of the caller, addressing information for messages to be sent to the caller, and other contact information is able to be included in the indication received by the device displaying the device presenting a notification with response options. In some examples, the device presenting a notification with response options is able to obtain further contact information for the caller placing the detected incoming call by searching contact information available to that device based upon whatever caller information is contained in the received indication of an incoming call.

The device presenting a notification with response options displays at the top of the presentation a notification title that includes the name of the caller placing the incoming call. The name of the caller, "JOHN DOE" in this example, is contained in the indication received by the device presenting a notification with response options. In another example, the received indication is able to only include the telephone number of the caller, and the device receiving the indication searches contact information available to that device to determine the name of the caller. The illustrated notification title further serves to notify the user that a message selected from the below displayed options is able to be sent to the caller.

The device presenting a notification with response options presents a number of predetermined messages that a user may select to be sent to the caller as a response to the an incoming call. The options presented on the device presenting a notification with response options are able to be selected by a user by indicating, in the illustrated example, a selection button within a number of radio buttons. As is understood by practitioners of ordinary skill in the relevant arts, radio buttons are a user interface technique that facilitates selecting one of a number of options by providing an input in association with one of the radio buttons. In further examples, other option selection techniques are able to be used to receive a selection of a response to be provided to the caller. The user interface of the device presenting a notification with response options generally includes facilities to receive a selection of one of the presented options. In further examples, other selection facilities are used to receive a selected response to the detected incoming call. For example, voice recognition is able to be used to select a presented option.

The illustrated device presenting a notification with response options presents a first radio button 312 that facilitates selecting a message stating "I'm on the phone." A second radio button 314 facilitates selecting a message stating "I'm on the phone & will call you shortly." A third radio button 316 facilitates selecting a user modifiable message stating "Will call you in _____ minutes" where the number of minutes is able to be specified by an input. In the illustrated example, the user modifiable message includes a time input box 322 that facilitates entering a time value that is included in the message delivered to the caller. The device presenting a notification with response options further presents a fourth radio button 318 that facilitates selecting a user supplied response message option. The fourth radio button 318 has text informing the user to "Enter your own message" and is near a text input box 320. The user is able to enter any text message in the text input box 320 that is to be delivered to the caller in response to the incoming call.

The device presenting a notification with response options further presents a "Don't send a message" option 330. In one example, a user's selecting this option results in a message being sent to the first device that indicates the incoming call should not be answered, and that a default disposition of the call should be made. An example where a user does not want to send a message is when the user is engaged in an internet conference and the user is sharing information. In such a scenario, the user may prefer to select ignoring the incoming call in order to avoid interrupting the meeting.

An example of a default disposition includes forwarding the incoming call to a voice mail system. In one example, performing the disposition associated with the "DON'T SEND A MESSAGE" option is able to be the default processing for incoming calls if a response message to send to the caller is not selected. In one example, this default disposition is performed when a timeout time duration elapses before a selection is made, such as in a case of a user's not providing any input to the device presenting a notification with response options.

The device presenting a notification with response options further presents a selection of a number of communications networks or media, which in this example each utilizes a different communications channel or network, over which the selected response message is to be sent. In the illustrated example, options for sending the selected response message include a BBM/IM button 332 that selects sending the message over the BBM network or other Instant Messaging (IM) network available to the device, an EMAIL button 334 that selects sending the selected response message over a conventional e-mail communications channel or network, and an SMS button 336 that selects sending the selected response message over an SMS channel or network. As discussed above, the response message is able to be sent by the first device or the second device based upon various factors, such as ability of the device to use the selected network, availability of the selected network to the device, configured preferences or user selections when both devices have access to the selected network, or combinations of these.

The device presenting a notification with response options also presents a VOICE MESSAGE button 338 that selects sending the selected response message as a voice message. Sending the selected response message as a voice message is able to be performed by, for example, the portable electronic device 100 or other device play a pre-recorded or synthesized voice message that conveys the selected message. In other examples, the audio response message is able to be provided to the caller by any suitable technique, such as sending an audio file via a data communications network to an address associated with the caller. The audio response message is able to be one or more of pre-recorded by the user, recorded messages provided by third parties, synthesized voice messages generated from the text message, or any combination of these. When an audio response message is sent to the caller, an option for the caller to leave a voicemail message may be provided. In an alternative example, the incoming call is able to be forwarded to a conventional or existing voice mail system after the voice response message is played. Other techniques are able to be used to convey the selected response message as a voice message to the caller.

Figure 4:
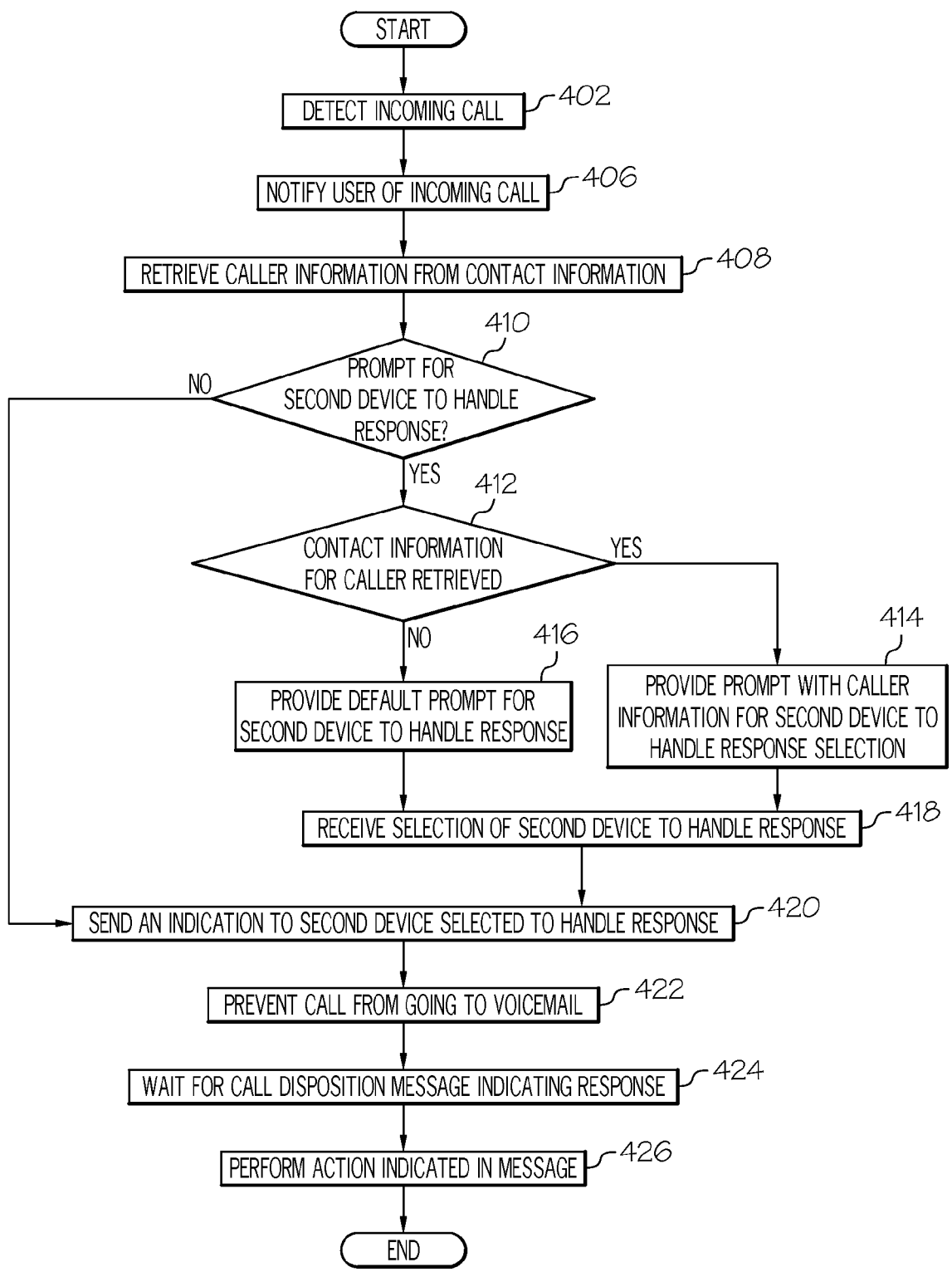
FIG. 4 illustrates an example of a method of handing an incoming call.
Figure 5:
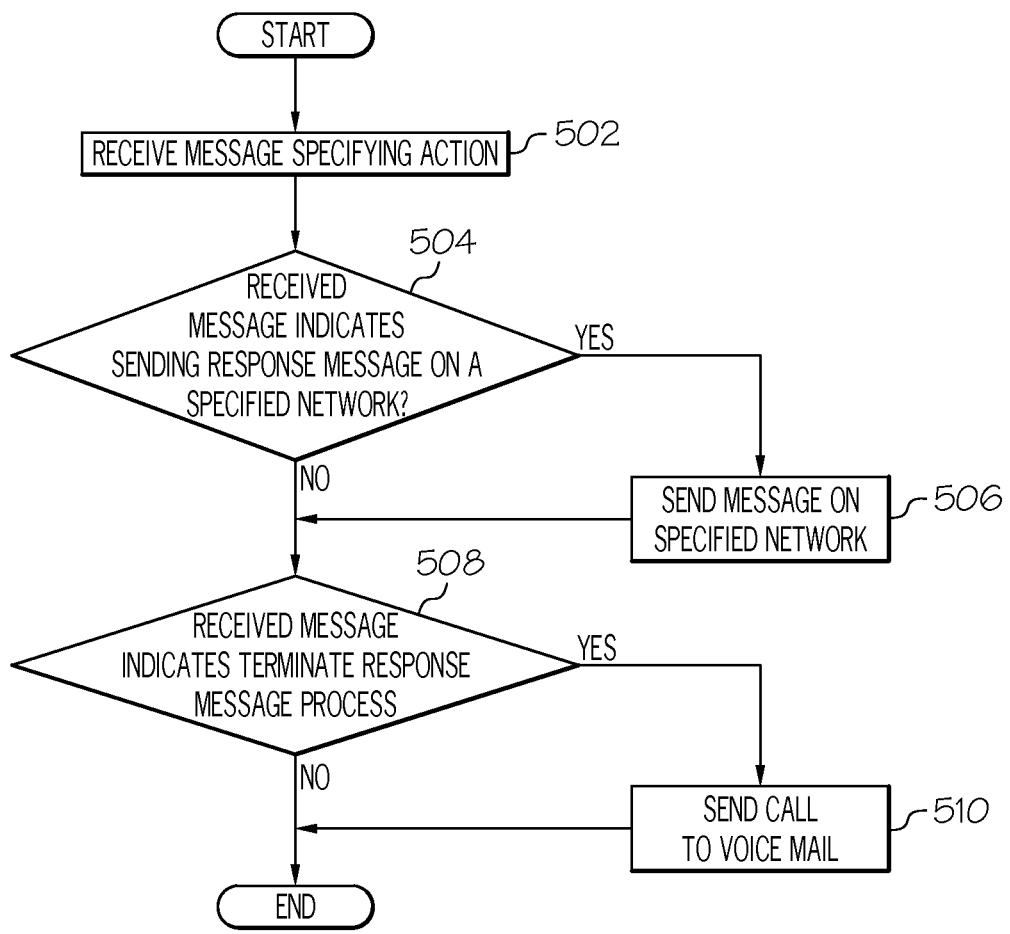
FIG. 5 illustrates an example of a call disposition message process.
Figure 6:
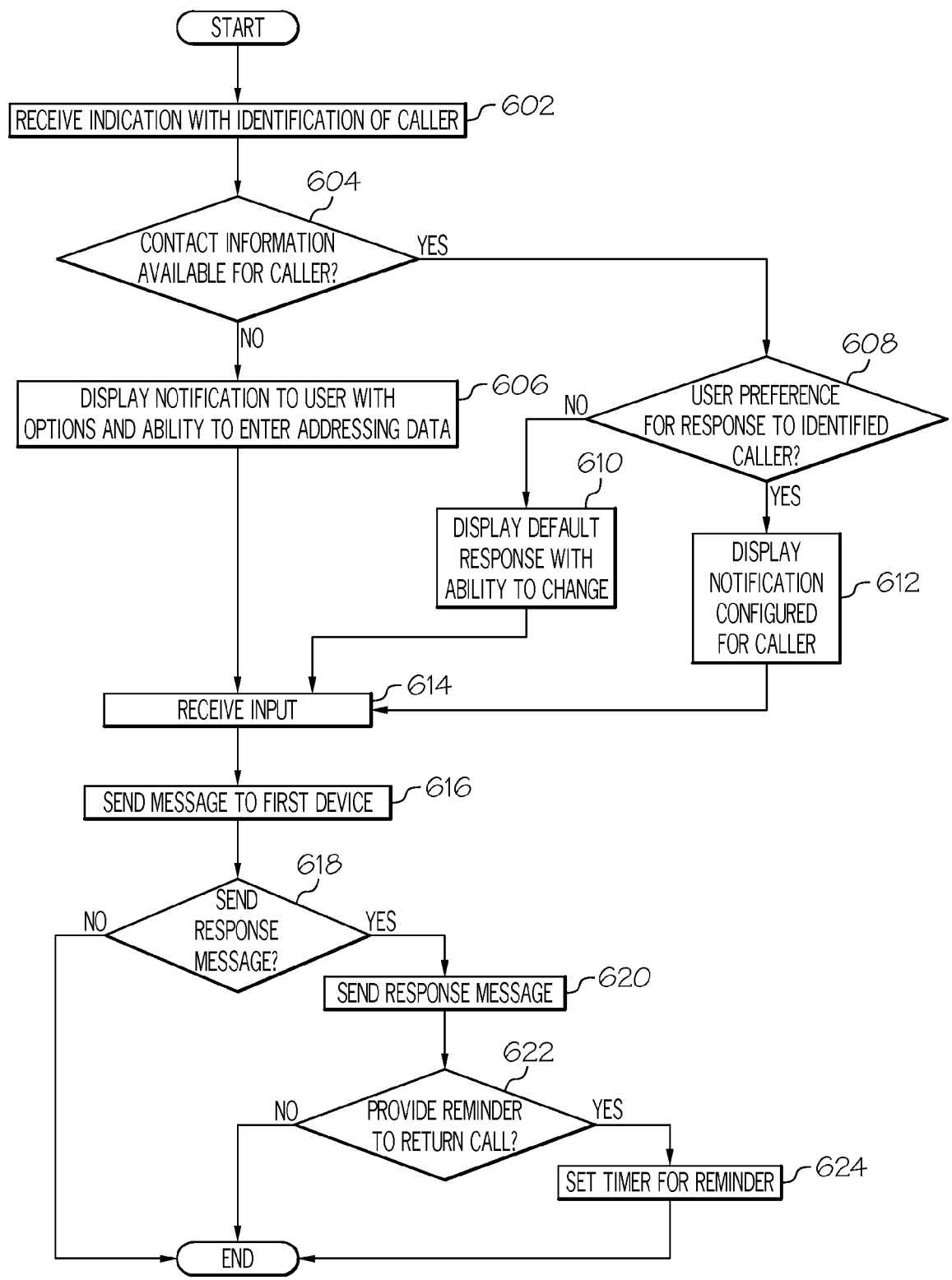
FIG. 6 illustrates an example of a response message selection process.

FIG. 4 through FIG. 6 depict flowcharts illustrating methods performed by various devices of the described examples. These methods may be carried out by software executed, for example, by the main processor 102. Coding of software for carrying out such methods is within the scope of a person of ordinary skill in the art given the present description. These methods may contain additional or fewer processes than shown and/or described, and may be performed in a different order. Further, the components of one or more of these methods are able to be performed by one processor or divided among multiple processors. Additionally, while these exemplary methods are illustrated with a particular order of steps, those of ordinary skill in the art will appreciate that the steps illustrated for these methods can be executed in any order that accomplishes the technical advantages of the present disclosure and can include fewer or more steps than illustrated. Additionally, components of the several methods described below are able to be combined into various composite methods that are performed by one processor or distributed among two or more processors. Computer-readable code executable by at least one processor of the portable electronic device to perform the method may be stored in a computer-readable medium, which may be a non-transitory or tangible storage medium.

The below described methods in one example facilitate responding to incoming calls by sending a message to the caller placing the incoming call. In one example, the below described methods augment conventional call handling processes, such as allowing an incoming call to be either answered or delivered to a voicemail system after a time duration. It is to be noted that various examples of the below described methods facilitate the methods to be performed under certain conditions, such as by facilitating a user's enablement of the methods or according to various other criteria. Examples further allow the processing of these methods to be terminated at any point and conventional incoming call processing to be resumed.

FIG. 4 illustrates an example of a method of handing an incoming call. The process may be performed by a processor of a device, referred to below as a destination communications device or a first device, to which an incoming call is directed. The method may be performed by the device that receives the call or by another device that is prompted to perform the method.

An incoming call directed to the first device is detected 402. In general, an incoming call is received as a result of a person, computer, or other entity placing a call to a destination communications device in order to establish a call with a user associated with the destination communications device. The person or entity that places the call or that is associated with the placing of the call is referred to herein as the caller. In general, an incoming call is detected when the telephone network routing the call to the destination communications device sends a "ring" signal or similar signaling to the destination communications device. In one example, an incoming call is detected when a "ring" signal or its equivalent is received from the telephone network. In one example, detecting an incoming call is able to alternatively be referred to as receiving an incoming call. It is to be understood that as used herein, an act of detecting an incoming call or receiving an incoming call does not require that the incoming call be accepted or answered by the device to which the call is directed or another device to which the call is forwarded.

A user or other entity is able to configure the communications device, or other parts of the telephone system, to perform the below described method in response to various conditions. For example, a device may be configured to perform the below described method when the device is already engaged in a call when the incoming call is received or when the user is in an activity that is not easily interrupted, such as being in a meeting. In one example, a meeting calendar program may automatically configure a communications device to respond to incoming calls by performing the below described method during times when that individual is scheduled to be in a meeting. In some examples, the communications device is configured to present the user with an option for responding to the call and does not make determination.

The first device in one example notifies the user of the incoming call 406 based on the detected incoming call. In general, the first device includes user interface elements, such as ringers, vibration generators, displays, and the like, to provide incoming call notifications. In other examples, an incoming call notification is able to be provided on another device, which may be directly associated with a user, of the communications device to which the incoming call is directed. For instance, enterprise communications systems sometimes include an ability to notify a person of an incoming call on a computer the person is using in addition to, or instead of, on the communications device itself. Several actions are able to be taken after the call notification is provided, such as the user answers the call, the call is sent to a voicemail system, or the caller hangs up and ends the incoming call.

Information about the caller is retrieved 408 from contact information based upon a caller's identification. An example of caller identification upon which data is able to be retrieved includes "Caller ID" information that is often received along with an incoming call on a conventional wired or wireless telephone. The caller's identification may consist of a telephone number of the telephone from which the caller is calling and from which the incoming call is originating. Further examples of caller identification data are able to include other information associated with or identifying the caller, or a combination of the originating telephone number and other information. Contact information is able to include various information for one or more individuals, including the individual's name, social networking identifiers, and the like, as well as contact information that describes mailing addresses, e-mail addresses, instant messaging channel addressing data, telephone numbers, or other identifiers for each individual that are used to send a call or message to a particular individual via one or more communications media. Examples of contact information for an individual include one or more of the individual's name, social network identifiers, telephone numbers, e-mail addresses, instant messaging addresses, other information that is able to be used to direct communications to that person, or combinations of these types of contact information. In one example that receives only the caller's telephone number with an incoming call, the caller information is retrieved by searching stored contact data for the caller's telephone number to identify the caller. The contact data is able to be maintained by a user or by an enterprise for use by many users associated with the enterprise. The retrieved caller information includes all of the available contact information for the identified caller. As described below, response messages are sent in one example to the caller of the incoming call through one or more communications media based upon addressing information retrieved from the contact information for the caller, such as a messaging system address for the caller, based upon the caller's identification received with the incoming call.

Whether the user is to be prompted to select a second device to handle a response to send to the caller of an incoming call is determined 410. In one example, the first device, such as the portable electronic device 100 telephone, presents a user interface that includes a list of second devices that are able to be used to select a response message for the incoming call. In one example, the first device, such as the portable electronic device 100, has a display, similar to a desk phone, that presents the user with a list of second devices that are able to be used to the response message. Examples of second devices that are able to be listed include a tablet computer, a desktop computer, another user interface device, or combinations of these. The second devices listed in this display are able to be chosen for display based on one or more criteria, such as being associated with the person being called, being in physical proximity to the telephone being called, any other criteria, or combinations of these.

When contact information for the caller was retrieved 412, the process continues at 414. Contact information for a caller of an incoming call may not be retrieved if, for example, the user's or enterprise's contact data does not include the caller's number. When contact information was retrieved at 412, a prompt with the caller's name is provided 414 along with options to select a second device to handle selecting a response message to send to the caller. In various examples, a first device, such as the portable electronic device 100 described above, that detects an incoming phone call is able to generate a user interface that displays a prompt that facilitates selecting a second device that the user is able to use to handle selecting how to respond to the incoming call. In one example, the user interface facilitates the selecting a second device from between or among two or more second devices associated with the user of the first device that detected the incoming phone call. For example, the prompt on the first device is able to include a list of second devices, such as a personal computer that the user is logged onto, a tablet computer associated with the user, as well as other devices. The user is able to select one of these second devices, such as by pressing a touchscreen or button associated with an item in the list, and thereby causing a processor to receive a selection of one of the second devices presented in the display.

When contact information was not retrieved 412, a default prompt for the incoming call is provided 416 along with options to select a second device to handle selecting a response message to send to the caller. In various examples, the default message simply displays the telephone number received as caller identification. In one example, a similar list of second devices that are able to handle selecting a response message is presented as is described above with regards to the prompt when contact information is retrieved. In various examples, a different list of second devices may be displayed when contact information is available relative to when no contact information is available.

A response message is received at 418. Based upon this received selection, an indication of the incoming call is sent 420 to the selected second device. In various examples, the indication of the incoming call that is sent to the other second device is able to include various amounts of data. In one example, the indication is able to include only the caller identification that was received with the incoming call. In another example, one or more items of contact information associated with the caller are able to be included in the indication, such as the caller's name, e-mail address, phone number, instant messaging channel, social network identifier, other identifying data, or combinations of these. In various examples, the indication is able to include any one of these data items, or any combination of these data items. The indication in one example is able to be sent over the network 150.

In addition to the above described first device that presents a prompt to facilitate selecting a second device to handle responding to the incoming call, the first device, which is the device that detects the incoming call such as the portable electronic device 100, is able to automatically send an indication of the incoming call to second electronic device, such as the electronic device 204. In one example, the first device may be configured to automatically send the indication of the incoming call to the second device when the first device is on a call, e.g., when a user is using the first device to conduct an ongoing voice or video call.

In further examples, the first device that detects an incoming call is able to send an indication of the incoming call to two or more electronic second devices, such as different iterations of the electronic device 204, that are each able to handle responding to the incoming call. In one example, the first device detecting an incoming call is able to send an indication of the incoming call to multiple electronic second devices and the user is able to use any one or more of those second devices to handle responding to the incoming call. For example, a user may have a desktop computer, a tablet computer, a smart phone, and potentially other second devices, associated with him or her. When an incoming call is detected on his or her desk phone, indications of the detection of the incoming call are sent to all of those electronic second devices. The user is able to utilize the tablet computer, the smart phone, or one of the other second devices to select a message to send to the caller in response to the incoming call. In some examples, a determination is made prior to sending the indication of the incoming call to determine if second devices associated with the user to whom the detected incoming call directed are available. Examples of determining if an electronic second device being available include determining that communications can be established with the electronic second device, which implies the second device is turned on and able to process incoming messages. In examples where indications of a incoming call are sent to multiple electronic second devices, a user is able to use any of the second devices that receives the indication to select a response to the incoming call. In one example, each second device that receives an indication of a detection of an incoming call presents options of responses to the incoming call from which the user can select one to send to the caller. An example of such a presentation is described with regards to the device presenting a notification with response options discussed above. In one example, the user is able to use the user interface of any electronic second devices that receives the indication of the detection of an incoming call to select the response to send to the caller, and that second device performs as described below to cause the selected response to be sent.

In one example, the communications first device operates to prevent 422 the incoming call from going to voicemail or be otherwise terminated by the first device that is the device to which the call is directed. In such an example, the caller placing the incoming call continues to hear an indication that the phone being called is continuing to ring. Preventing the incoming call from going to voicemail or be otherwise terminated facilitates selecting a response message to send to the caller by providing more time to make the selection. In some examples, the incoming call is not prevented from going to voicemail and will be directed to voicemail, or otherwise disposed of, according to a default configured for the first device or communications system.

The first device that detected the incoming call waits 424 for a call disposition message that indicates a response to the detected incoming call. In one example, the call disposition message is received from the selected second device to which the indication was sent, as described above. As is described below, the received call disposition message is able to indicate various types of responses to the incoming call. In one example, the indicated response is able to include a response message that is to be sent to the caller along with a specification of a communications medium an address to which the response message is to be sent. In another example, the call disposition message is able to specify a response that the incoming call is to be sent to voicemail, terminated, or otherwise disposed of. In a further example, the call disposition message may indicate that the response is to answer the incoming call.

The action specified in the message is performed 426. In the illustrated example, the action is taken while the incoming call is active because the process may prevent the incoming call from going to voicemail. In further examples, the incoming call is not prevented from going to voicemail, or prevented from being otherwise disposed of, and therefore the call disposition message may be received after the incoming call is no longer present at the first device. In such a situation, some actions specified in the received call disposition message are able to be performed even though the incoming call is no longer present at the first device, such as sending a response text message to the caller.

In one example, the disposition message is able to include a response message to send to the caller. The disposition message is also able to, but is not required to, include a communications network over which to send the response message that is included in the disposition message. In some examples, a response message that includes text to send to the caller is able to specify sending that text over, e.g., an e-mail channel or network, an SMS channel or network, an Instant Messaging or BBM network, any other data network, or combinations of these.

FIG. 5 illustrates an example of a call disposition message process. The call disposition message process is an example of performing action indicated in a message as described above. A call disposition message is received 502, which message identifies an action to take in response to the detected incoming call.

A determination is made 504 whether the call disposition message indicates sending a response message to the caller. In one example, a call disposition message that indicates sending a response message is further able to include the contents of the response message to send, as well as a communications network over which to send the message and addressing information to use on that communications network. In one example, addressing information for the response message is obtained from contact information stored for the caller, which is retrieved as described above. When the call disposition message indicates sending a response message to the caller, the message is sent 506.

A determination is made 508 whether the call disposition message indicates terminating the response message process. When the call disposition message indicates terminating the response message process, the call in one example is sent to voicemail 510. After the call is sent to voicemail, or when the call disposition message indicates not terminating the response message process, the process ends.

FIG. 6 is flowchart illustrating an example of a response message selection process. The response message selection process may be performed by a second device, such as the electronic device 204 discussed above. The response message selection process may be performed in response to receiving an indication of an incoming call that is sent from a first device, such as the portable electronic device 100, in response to detecting an incoming call. The use of a second device, that is separate from the first device to which the call is directed, to perform the response message selection process facilitates using user interface facilities of the second device to select a response to the incoming call. In one example, the user may be on a call using the first device and the first device is pressed against the user's head and the user is unable to use user interface facilities of the first device. In another example, the second device is able to be a device with more convenient user interface facilities, such as a tablet computer, a laptop or desktop personal computer, or other device.

An indication of an incoming call is received 602 on a first device. This indication may include an identification of the caller who placed the incoming call. The indication is sent from the first device to which the incoming call is directed. In various examples, the network 150 may operate to direct the incoming call to another device that is not the first device receiving the indication of the incoming call or the second device performing the response message selection process. The indication in one example is received via the communication network 150.

In one example, the received indication corresponds to the sent indication described above 420. As described above, the indication is able to include various amounts of information about the caller who placed the incoming call. In one example, the received indication is able to include only the telephone number of the telephone that placed the incoming call. In further examples, the received indication is able to also include other information about the caller, such as one or more of the caller's name, e-mail address, instant messaging channel, social network identifier, or other information about the caller.

A number of response options are displayed to the user of the second device in response to receiving the incoming call notification. In one example, these response options are presented as a call notification that includes a list of options, some of which include input boxes or other features that facilitate entry of data to be included in the selected response. An example of the displayed call notification is described above with regards to FIG. 3. As described above, the displayed call notification is able to include any available caller information, such as the caller's identification received with the incoming call, a geographic area associated with the caller's telephone number, other data deemed relevant that is able to be obtained from any source, or combinations of these. Along with displaying the notification of the incoming call, an ability to enter data to be included in a response message is also provided to the user. When an incoming call is received from a caller for which no retrieved caller information is available, the user may enter, for example, messaging address information based upon the user's knowledge or based upon any extrinsic information, such as by recognizing the caller's telephone number.

In response to receiving the indication, a determination is made 604 when contact information is available for the caller identified in the indication. Contact information for the caller, such as the caller's name, an e-mail address for responses, and so forth, is able to be included in the received indication. Alternatively, the second device performing the response message selection process is able to obtain contact information by, for example, searching a contact information database available to that second device for the caller identification that is provided in the indication. Other techniques are able to be used to obtain contact information for the caller identified in the received indication. Contact information for a caller of an incoming call may not be available if, for example, the available contact data does not include the caller's number.

In the case of receiving an incoming call for which contact information is not available, a notification of the incoming call is displayed 606 along with options to enter data for a response message to be sent to the caller. The displayed notification is able to include any caller information available, such as the caller's identification received with the incoming call, a geographic area associated with the caller's telephone number, other data deemed relevant that is able to be obtained from any source, or combinations of these. Along with displaying the notification of the incoming call, an ability to enter data to be included in a response message data is also provided to the user. In the event of receiving an incoming call from a caller for which there is no retrieved caller information, the user is able to enter, for example, messaging address information based upon the user's knowledge based upon any extrinsic information, such as by recognizing the caller's telephone number. In one example, an option to send an SMS text message to the caller's telephone number provided with the incoming call, such as through Caller ID.

In the case of receiving an indication of an incoming call for which contact information is available, a determination is made at 608 whether the second device has stored preferences for responding to the caller identified in the indication. In one example, a user selects a preferred message to send to a particular caller when the user is unable to answer a call from that particular caller. The user may identify in the preferences which communications channel or network delivers that message. In one example, preferences are stored for different response messages for particular callers. For example, a user may configure a preference to respond to incoming calls placed by callers with telephone numbers associated with friends of the user by automatically sending an e-mail message indicating that the person being called is busy and will call back later. The user may also configure another preference to respond to incoming calls with caller telephone numbers that are associated with his or her managers, customers, or other persons by sending a text message indicating that the person being called is in a meeting and will return the call within a specified time. That person is also able to specify that, for example, certain callers are to be provided with a recorded voice message that apologies for not accepting the call. For example, the second device may receive, from a user, input including a preference for a particular caller that specifies that an SMS text message stating "I'm in a meeting" is the default to be sent to a particular caller, and that an e-mail stating "I'm sorry, I am unavailable and will return your call within one day" be sent to a particular e-mail address as a default when responding to another caller.

If no preference is configured for the caller 608, a default notification is displayed at 610 of the first device to which the incoming call is directed. The default notification is able to be configured in a configuration set in any location, including in a configuration maintained in the first device, in an enterprise communications configuration database that controls first device configurations for all devices owned by the enterprise, or in any location. The displayed notification is able to provide, for example, a notification of the received incoming call without any options for the user, is able to present options of two or more response messages that are able to be selected to be sent to the caller, is able to include facilities to receive user input to be incorporated into the response message, or any combinations of these. If, however, it is determined at 608 that a preference is configured for the caller, a notification that conforms to the preference for the caller is displayed at 612.

The displayed notification in any of the above scenarios is able to include addressing information that specifies the destination to which the response message is to be sent. For example, the caller's telephone number provided by Caller ID is able to be displayed in the notification as a destination for an SMS text message or to which a voice message is to be sent. In the case of an incoming call for which contact information is available, the available contact information that is able to be used as a destination for a response message is able to be displayed. For example, an option to send an e-mail message is able to be presented in the displayed notification that has an e-mail destination address obtained from the contact information. In the case of contact information for a caller that includes multiple e-mail addresses, the displayed notification is able to facilitate selecting one of those e-mail addresses as a destination for that e-mail response message. The displayed notification is also able to present available contact information for the caller that includes addresses for different messaging types, such as one or more addresses for each of e-mail, SMS text messaging, Instant Messaging, or other types of messaging. In such an example, the address or addresses for each message type is able to be presented in the notification. If multiple addresses are available for a particular messaging type, the displayed notification is able to facilitate selecting of one of the addresses for a selected message type to be used as a response message for the incoming call. Further, the display notification is able to facilitate directly entering destination addressing information to be used in sending the response message.

In one example, the displayed notification is able to be presented as a sequence of displays, such as pop-up windows or other presentations, that present a sequence of options from which a user is able to select aspects of responses to provide to received incoming calls. Each of these sequential displays present different types of options and that facilitate selecting one from each type of option. In one example, an initial, or first stage, pop-up window is able to be configured or selected to be displayed, where the initial pop-up window facilitates answering yes or no to a question such as "Do you want to send a message?" If the person called answers "yes," the next, or second stage, pop-up window facilitates selecting a message to send to the caller. A subsequent, or third stage, pop-up window facilitates selecting how the response message is to be sent to the caller. A subsequent, or fourth stage, pop-up window facilitates the addressing the response message to the caller.

Various aspects of handing incoming calls, such as the format of incoming call notifications that are presented to a user, the set of selectable response messages included in those incoming call notifications, other selectable options for handling the incoming call, communications networks to be used to send selected response messages, any other aspect of the incoming call notification and handing of responses thereto, and combinations of these options, are stored for a user in a "preferences" storage, such as the above described enterprise wide preference database 224, the preference database 226, or combinations thereof.

After displaying one of the above described incoming call notifications, an input associated with the notification is received 614. In general, the input is received at the second device through user interface facilities of the second device. The received input reflects a selection made by a user that indicates one or more responses to the incoming call. Examples of received inputs include: an indication to simply dismiss the notification, a specification of a text, audio, or other type of message to send to the caller over a specified communications network, or other types of actions are able to be specified by the input. In some examples, dismissing the notification is interpreted as an indication to perform the default processing for the receiving the incoming call. The received input in some examples are able to include addressing information for a response message that is to be sent, such as an e-mail address, a telephone number to which a voice or SMS text message is to be sent, a social network identifier, or any other specification of a destination that is to receive the response message.

In one example, a transmitting device, which is the device that transmits the response message to the call, is selected based upon one or more criteria. In one example, one of the first device or the second device is selected as the transmitting device. The selection of the transmitting device may include determining devices, from within either the first device or the second device, that are able to transmit the selected response message over the selected communications network. Based upon the determination of the devices that are able to transmit the selected response over the selected communications network, a determination is made if only one device is able to communicate over the selected communications network. When only one device is able to transmit over the selected communications network, that one device is selected as the transmitting device. When more than one device is able to transmit over the selected communications network, a determination is made if preference data for the user defines one of those devices as a preferred transmitting device that is to transmit the response message. If preference data defines a preferred transmitting device, the selected transmitting device is the preferred device. Based upon preference data or operating configurations of the second device, options for the transmitting device is able to be presented to the user, such as through a pop-up window or other user interface facility. A user input is able to be obtained through user interface facilities in response to the options presented to the user, where the user input includes a selection that identifies one of the first device or the second device as the transmitting device selected to transmit the response message. Such a user input is able to be received to override a preferred transmitting device defined in preferences or to define the transmitting device in the absence of preferences.

After receiving an input in response to the notification, a message is sent 616 to the first device, i.e., the device that sent the received indication described above with regards to 602. The message sent to the first device is able to include varying amounts of information. Information contained in the message sent to the first device is able to be based upon the input received from the user in response to the display of the notification.

A determination is made 618 whether a response message is to be sent to the caller from whom the incoming call is received. If no response message is to be sent, the method ends.

If a response message is to be sent, the response message is sent to the caller 620. The content, format, other characteristics, or combinations of these aspects of the response message are able to be based upon the input received in response to the displayed notifications. As described above, the notification presented to the user is able to present one or more options for responding to an incoming call. These options are able to include a selection of a response message to send to the caller placing the incoming call. These response messages are able to be a recorded voice message, a text message communicated by one or more communications media such as SMS, e-mail, private texting networks, and the like, or any combination of these.

In various examples, the response message can be sent by any device, such as described above, independently of the device to which the incoming call is directed. For example, the first device is a wireline phone and the user may select a button on the wireline phone to transfer to a computer the processing associated with one or more of receiving user input to select response messages or creating and sending the response message to the caller. In one example, the incoming call notifications to send a response message is able to be provided when the person being called is using the telephone. For example, the person being called, i.e., the person associated with the first device, may be using another phone, such as the user's wireline phone, when an incoming call is received on a first device such as his or her cell phone.

The second device in one example sends a message to the first device indicating the response to the caller. In one example, the message to the first device that indicates the response also commands the first device to send the call to voicemail, or to let the call go unanswered. In one example, when the first device sends the indication of the incoming call, the first device prevents the incoming call from going to voicemail until a message is received from the second device that indicates the response, thereby facilitating answering the incoming call by the user if desired.

A determination is made 622 whether a reminder to return the received incoming call is to be provided. In one example, a preference is able to be configured that specifies providing a reminder at some time after an incoming call is received when a response message was sent to the caller and the call was unanswered. This determination is also able to be based upon an identification of the caller from whom the incoming call is received and configurations associated with that caller.

When a reminder is to be provided, a timer may be set 624 to provide the reminder. As an alternative to setting a timer, the reminder may be displayed after termination of the call that was being conducted when the incoming call was detected. In either example, providing the reminder is able to be handled by various processes, such as an appointment calendar application, another timing application, any other application, or combinations thereof. An example of a reminder is a pop-up window message displayed on one or more devices that are associated with the person being called, such as the first device, the second device, other devices, or combinations of those devices. A list of callers and their phone numbers is able to be provided in that pop-up window or other display, in a different display, or both. In one example, one or more user interface input devices, such as physical or virtual buttons, are able to be configured to auto-dial the previous callers in order to return the incoming call that was not accepted. In one example, multiple buttons that each represents one of the callers are able to be displayed in either a chronological or a reverse chronological order of the order in which the calls were received. In one example, two or more devices are able to be interconnected such that reminders to return calls from those two or more devices are all handled by a single device. In one example, a computer is able to be designated as the device to handle reminders of previous calls for which messages were sent to the caller. In this example, a comprehensive list is able to be made that includes all of the callers to whom messages were sent, and thereby easily facilitating responding, by the person being called, to those calls by placing a return call or by other techniques.

If no response message was determined to be sent 618, when no reminder is determined to be provided at 622 or after a timer is set at 624, and the process ends.

The above described examples facilitate a user's response to an incoming call by sending to the caller a response message that is selected from a list of response messages. These response messages facilitate providing, by the person who is receiving the call, more accurate and timely response information to the caller than is provided through a conventional voicemail answering system. Further, utilizing a second device to select the response message facilitates a more convenient operation to select the response message to be sent. Utilizing a second device is particularly effective when the user's first device is held to the user's ear. These components operate to send the selected response message to the caller without interrupting the call that is in progress when the incoming call is detected.

The logical operations of various examples are implemented as: a sequence of computer-implemented steps, operations, or procedures running on a programmable circuit within a general use computer, a sequence of computer-implemented steps, operations, or procedures running on a specific-use programmable circuit; and/or interconnected machine modules or program engines within the programmable circuits. The portable electronic device 100 shown in FIG. 1 can practice all or part of the recited methods, can be a part of the recited systems, and/or can operate according to instructions in the recited non-transitory computer-readable storage media. Such logical operations can be implemented as modules configured to control the processor 102 to perform particular functions according to the programming of the module. In one example, multiple modules are able to be stored in programs 148 and configured to control the processor 102.

Examples also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including smart-phones, personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that communicate (either over hardwired channels, wireless channels, or by a combination thereof) through a communications network. In a distributed computing environment, program modules may be located in both local and remote memory storage devices.

The present disclosure may be embodied in other specific forms without departing from its spirit or essential characteristics. The described examples are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

The invention claimed is:

1. A method operative on a portable electronic device associated with a party being called, the method comprising:
   detecting an incoming voice call over a first communications channel from a caller;
   in response to the detecting, sending an indication of the incoming call to a second electronic device, the indication identifying the caller and comprises addressing information for the caller, other than a telephone number of the caller, on a second communications channel, the addressing information to be used in sending a text message over the second communications channel to the caller;
   receiving, from the second electronic device, the text message to send to the caller; and
   sending the text message from the electronic device to the caller over the second communications channel that is independent from the first communications channel.

2. The method of claim 1, further comprising preventing, based on the sending, the incoming call from going to voice mail prior to sending the text message.

3. The method of claim 1, wherein the electronic device comprises a portable electronic device, and wherein the second electronic device is one of a tablet computer, a personal computer, and a wired telephone.

4. The method of claim 1, wherein the sending automatically occurs when the electronic device is on a call when the incoming call is detected.

5. The method of claim 1, further comprising:
   displaying a list comprising a respective indication for each of a plurality of devices;
   receiving, based on displaying the list, a selection of a selected device within the plurality of devices; and
   identifying, based on the selection, the second electronic device to correspond to the selected device.

6. The method of claim 1, wherein the indication is sent on a communications channel coupling the electronic device to the second electronic device.

7. The method of claim 6, wherein the communications channel comprises at least one of a wired communications channel, a network communications channel, and a local wireless communications channel.

8. The method of claim 1, wherein the text message further comprises:
   an indication specifying that the message is to be transmitted by the electronic device;
   contents of the response;
   a specification of a communications network comprising the second communications channel; and
   addressing information to use on the communications network to send the text message to the caller, and
   wherein the sending comprises sending the text message from the electronic device to the caller over the communications network based on the addressing information within the message.

9. The method of claim 1, wherein the text message further comprises an identification of the second communications channel.

10. The method of claim 1, wherein sending the response comprises one of an e-mail comprising the text message and an instant messaging message comprising the text message.

11. A method operative on a portable electronic device associated with a party being called, the method comprising:
    receiving an indication of an incoming voice call from a caller, the incoming call being directed over a first communications channel to a second electronic device different from the electronic device, the indication identifying the caller and further comprises addressing information for the caller, other than a telephone number of the caller, on a second communications channel, the addressing information to be used in sending a text message over the second communications channel to the caller;
    displaying a plurality of response options to send to the caller;
    receiving, based on the displaying, a selection of a first response that is within the plurality of response options; and
    sending to the caller, independently of the second device by the electronic device through the second communications channel that is independent of the first communications channel, the text message comprising the first response.

12. The method of claim 11, further comprising:
    sending, to the second electronic device by the electronic device, a call disposition message comprising:
    contents of the first response;
    a specification of a communications network comprising the second communications channel; and
    addressing information used by the communications network to send a response message comprising the contents of the first response to the caller; and
    sending, to the second electronic device, a command to send the first response to the caller.

13. The method of claim 12, further comprising:
    displaying a plurality of communications networks over which to send the message;
    receiving, based on the displaying the plurality of communications networks, a selection of a selected communications network as the second communications channel; and
    determining, in response to receipt of the selection of the selected communications network, that the electronic device has access to the selected communications network,
    wherein the sending the text message is in response to determining that the electronic device has access to the selected communications network, and
    wherein the sending the call disposition message and the sending the command to send the first response to the caller is in response to determining that the electronic device does not have access to the selected communications network.

14. The method of claim 11, further comprising receiving a selection of a transmitting device for the response, wherein the selection identifies one of the electronic device and the second electronic device as the transmitting device, and wherein the sending to the caller the message is based on the selection identifying the electronic device as the transmitting device.

15. The method of claim 11, wherein the second electronic device comprises a portable electronic device, and wherein the electronic device is one of a tablet computer, a personal computer, and a wired telephone.

16. The method of claim 11, wherein the indication is sent on a communications channel coupling the electronic device to the second electronic device.

17. The method of claim 16, wherein the communications channel comprises at least one of a wired communications channel, a network communications channel, and a local wireless communications channel.

18. A portable electronic device associated with a party being called, the portable electronic device comprising:
a processor configured to:
detect an incoming voice call over a first communications channel from a caller;
send, based on a detection of the incoming call, an indication of the incoming call to a second electronic device different from the electronic device, the indication identifying the caller and comprising addressing information for the caller, other than a telephone number of the caller, on a second communications channel, the addressing information to be used in sending a text message over the second communications channel to the caller;
receive, from the second electronic device, the text message to send to the caller; and
send the text message from the electronic device to the caller over the second communications channel that is independent from the first communications channel.

19. A portable electronic device associated with a party being called, the portable electronic device comprising:
a processor configured to:
receive over a first communications channel, from a second electronic device, an indication of an incoming voice call from a caller, the incoming call being directed to the second electronic device, the indication identifying the caller and further comprises addressing information for the caller, other than a telephone number of the caller, on a second communications channel, the addressing information to be used in sending a text message over the second communications channel to the caller;
display a plurality of response options to send to the caller;
receive, based on the display, a selection of a first response that is one of the plurality of response options; and
send to the caller, independently of the second device, through the second communications channel that is independent of the first communications channel, the text message comprising the first response.

\* \* \* \* \*